(12) United States Patent
Martin

(10) Patent No.: US 10,731,928 B1
(45) Date of Patent: *Aug. 4, 2020

(54) HEAT EXCHANGER PLENUM APPARATUS

(71) Applicant: E&C FinFan, Inc., Ball Ground, GA (US)

(72) Inventor: Indian Martin, Tulsa, OK (US)

(73) Assignee: E&C FinFan, Inc., Ball Ground, GA (US)

( * ) Notice: Subject to any disclaimer, the term of this patent is extended or adjusted under 35 U.S.C. 154(b) by 53 days.

This patent is subject to a terminal disclaimer.

(21) Appl. No.: 16/248,530

(22) Filed: Jan. 15, 2019

Related U.S. Application Data

(63) Continuation of application No. 14/947,647, filed on Nov. 20, 2015, now Pat. No. 10,215,506.

(60) Provisional application No. 62/083,006, filed on Nov. 21, 2014.

(51) Int. Cl.
*F28F 9/00* (2006.01)
*F28F 9/013* (2006.01)
*F01N 13/18* (2010.01)

(52) U.S. Cl.
CPC .............. *F28F 9/013* (2013.01); *F28F 9/002* (2013.01); *F01N 13/1805* (2013.01); *F01N 2240/02* (2013.01)

(58) Field of Classification Search
CPC ....... F28F 9/013; F28F 9/002; F01N 13/1805; F01N 2240/02
USPC .......................................................... 165/67
See application file for complete search history.

(56) References Cited

U.S. PATENT DOCUMENTS

| | | | | |
|---|---|---|---|---|
| 1,380,123 A | * | 5/1921 | Sullivan | F02B 63/04 290/1 A |
| 2,182,204 A | * | 12/1939 | Hector | F01N 1/02 181/266 |
| 4,226,214 A | * | 10/1980 | Palazzetti | F02B 63/04 123/2 |
| 10,215,506 B2 | * | 2/2019 | Martin | F01N 13/1805 |
| 2012/0012733 A1 | * | 1/2012 | Fowler | B60K 13/04 248/674 |

* cited by examiner

*Primary Examiner* — Davis D Hwu
(74) *Attorney, Agent, or Firm* — Cook Alex Ltd.; R. Blake Johnston

(57) ABSTRACT

A heat exchanger plenum apparatus comprising structure to support, among other components, an engine silencer substantially incorporated therein.

20 Claims, 10 Drawing Sheets

HEAT EXCHANGER PLENUM APPARATUS

CROSS-REFERENCE TO RELATED APPLICATIONS

This application is a continuation application of U.S. patent application Ser. No. 14/947,647, filed Nov. 20, 2015, which claims the benefit of U.S. Provisional Application No. 62/083,006, filed Nov. 21, 2014, the contents of which are incorporated herein by reference in their entirety for teachings of additional or alternative details, features, and/or technical background, and priority is asserted from such.

BACKGROUND OF THE INVENTION

Field of the Invention

The present invention generally relates to the structure of a heat exchanger plenum apparatus such as (without limitation) might be constructed to support an internal engine silencer.

Description of the Related Art

Heat exchangers come in various types to transfer heat between one or more mediums. Mediums may be a gas, a liquid, a solid, or a combination. For example, a heat exchanger may allow for the flow of air (second medium) over or around one or more series of tubes in which a liquid (first medium) flows, thereby cooling or heating the liquid.

A plenum structure may comprise the heat exchanger to support the heat exchanger and provide for safer transport. In certain circumstances, a heat exchanger plenum structure might form part of a modular system whereby the system when broken down into its modular units, such as skids, is transportable to and from remote site locations. The skids are then interconnected at the remote site, thereby forming the system. By way of example as used in the natural gas and oil industry, a heat exchanger plenum apparatus may require use of a forced-air fan driven by an auxiliary internal-combustion engine that is mounted on a separate skid. In the preceding example, the internal-combustion engine is connected, at the remote site, to the fan and/or heat exchanger plenum apparatus by use of ancillary components to complete the system. These ancillary components arrive separate from the skids requiring their installation and setup at the remote site introducing added costs and difficulties. In prior designs, the engine silencer may be mounted atop and exterior to the heat exchanger plenum, creating a transportation issue due to its height. The silencer, on these prior designs, required removal of the engine silencer prior to transportation, and the need for an additional truck to transport the engine silencer. At the remote site a crane is employed to reinstall the silencer adding additional cost and time.

The heat exchanger plenum apparatus disclosed herein resolves these difficulties. Although various forms of the heat exchanger plenum apparatus have been devised, no prior attempts have been made to incorporate a motor engine silencer into a heat exchanger plenum apparatus.

SUMMARY OF THE INVENTION

There is disclosed herein an exemplary embodiment of a heat exchanger plenum for incorporating an engine silencer therein, the heat exchanger plenum may comprise an interior volume defined by the heat exchanger plenum and a truss diposed within the interior volume of the heat exchanger plenum for supporting the engine silencer. The heat exchanger plenum may further comprise a heat exchanger diposed substantially within the interior volume dividing the interior volume into a first part and a second part, wherein the truss for supporting the engine silencer may be located within said second part. The heat exchanger plenum may be configured wherein the second part of the interior volume is associated with an output of the heat exchanger. The heat exchanger plenum may also be configured such that the heat exchanger output has an upwardly directed flow.

Additionally the heat exchanger plenum may be portable and may further comprise openings within the truss for connection of the engine silencer to external piping. Some configurations may provide for a heat exchanger plenum further comprising a heat exchanger substantially disposed within the interior volume and comprising an angular position relative to a horizontal axis traversing through said heat exchanger. The heat exchanger plenum may additionally comprise at least one exterior panel having one or more of the following: a cutout for connecting peripheral equipment, and an access door for gaining access to the interior volume. If so desired or required, a heat exchanger plenum may comprise access doors attached thereto for gaining access to said engine silencer.

In an alternative exemplary embodiment a heat exchanger plenum may comprise an interior volume defined by the heat exchanger plenum, an engine silencer, and a truss diposed within the interior volume of the heat exchanger plenum for supporting the engine silencer. The heat exchanger plenum of claim 10, wherein said engine silencer is substantially within said interior volume. In the instant embodiment the heat exchanger plenum may further comprise a heat exchanger diposed substantially within the interior volume dividing the interior volume into a first part and a second part; the truss for supporting the engine silencer located within the second part.

The heat exchanger plenum second part of the interior volume may be associated with an output of the heat exchanger and such output may have an upwardly directed flow. The heat exchanger plenum of this embodiment may be portable. Openings may be comprised within the truss for connection of the engine silencer to external piping. Additionally, the heat exchanger plenum may further comprise a heat exchanger substantially disposed within the interior volume and comprising an angular position relative to a horizontal axis traversing through the heat exchanger.

In a further alternative embodiment of a heat exchanger plenum incorporating an engine silencer therein, the heat exchanger plenum may comprise an interior volume defined by the heat exchanger plenum, and a truss diposed within the interior volume of the heat exchanger plenum for supporting the engine silencer. A surge tank may be hingedly mounted to the heat exchanger plenum. The heat exchanger plenum may further comprise a slotted hinge bracket mounted to the heat exchanger plenum and fastened to a corresponding surge tank bracket affixed to the surge tank, wherein the slotted hinge bracket and corresponding surge tank bracket interface to provide movement of the surge tank about the interface. In this embodiment the heat exchanger may further be portable.

BRIEF DESCRIPTIONS OF DRAWINGS

DETAILED DESCRIPTION OF THE INVENTION

Figure 1:
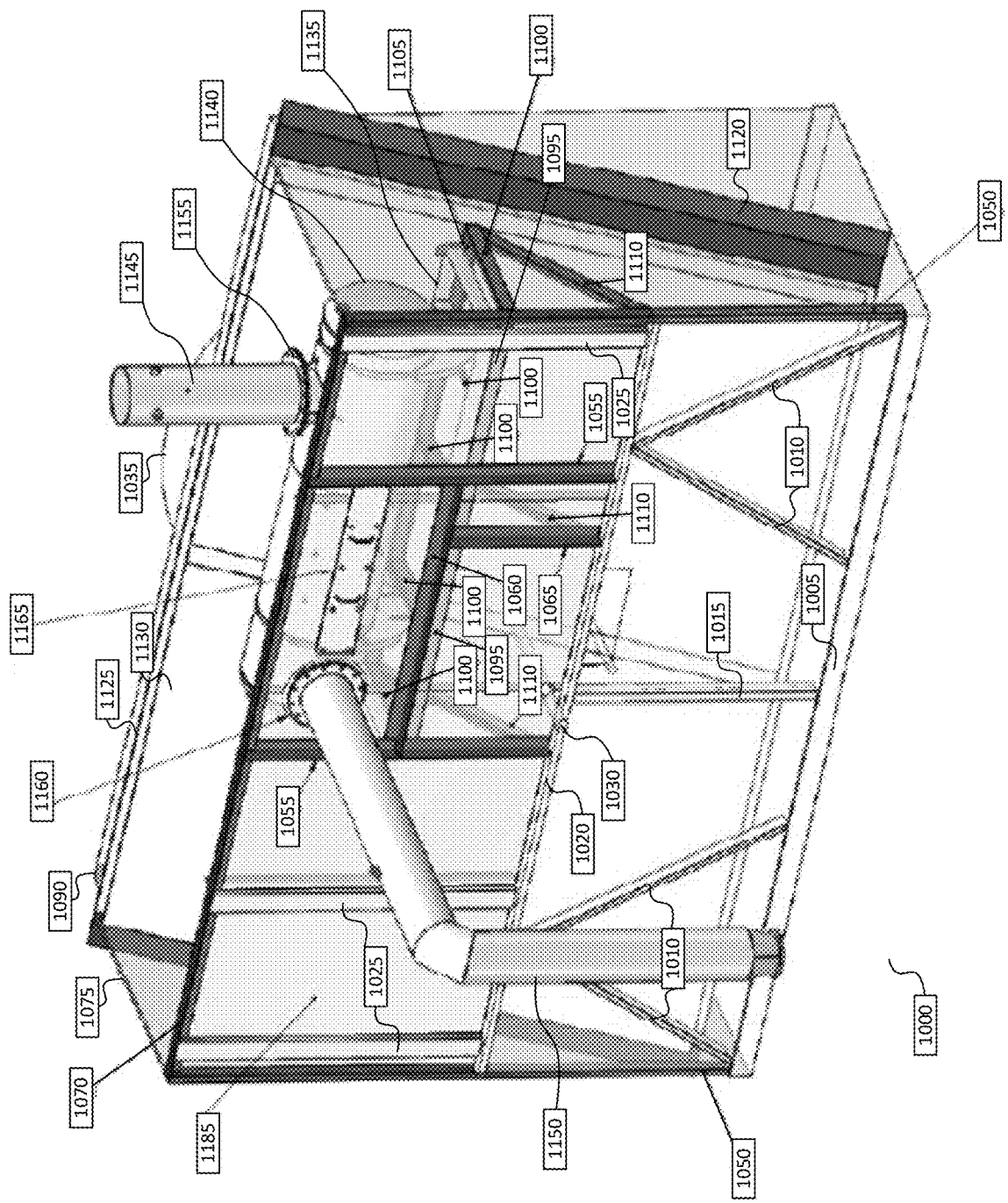
FIG. 1 is an isometric overall depiction of an exemplary embodiment of a heat exchanger plenum structure constructed to support an internal silencer and depicts a silencer installed.

A mechanical structure is provided wherein an engine silencer can be incorporated inside of a heat exchanger plenum, thereby producing a flush or nearly flush surface. The heat exchanger may be an air-cooled or liquid-cooled type, and may incorporate one or more sections to control the temperature of various gases, or fluids, or other mediums. The heat exchanger plenum may be embodied into a portable structure, such as may be configured to transport, for instance, on a truck trailer. In one embodiment, the portable structure may be arranged as a skid package or part of a skid package.

The mechanical structure, such as a truss, is provided to support the weight of an engine silencer within the interior volume of the heat exchanger plenum. The truss, while supporting the engine silencer within the interior volume of the plenum, may be attached to the superstructure of the plenum and extend to the exterior bounds of the superstructure. Formation of the truss, and attachment of the truss to the superstructure of the plenum, may be accomplished by welds, fasteners, or a combination thereof. The truss may be configured to either the left or right of centerline with reference to the upwardly facing side of the heat exchanger tube sheet.

The engine silencer may be removable from the structure and replaced; held in place via mechanical fasteners, or attached by more permanent means, such as welding. To facilitate removal and insertion (such as for replacement), the truss may incorporate registration pins or blocks. The truss, as well as the plenum may have one or more openings and can provide access via doors and interconnection with periphery structures (or equipment) via cutouts in the plenum to connect, for example, the exhaust piping to the engine silencer. The plenum structure and/or the truss may have an opening formed for exhaust gasses to enter the plenum and silencer, and a further opening formed for the exhaust gasses to exit the silencer and plenum. Exhaust gas piping may be routed through these openings to mount to the silencer. The piping may also share an opening.

The engine silencer may be mounted on a slidable skid, or intermediate silencer mounting frame assembly, that is then held in and supported by the truss as described above. The slidable skid may facilitate removal via the end or top of the plenum. The plenum may or may not have a top surface panel(s) or cover(s), in which case the top of the plenum can be open, closed or partially closed. The other, or remaining, sides of the plenum may have panels or covers, such as the ends, bottom, or back, and may cover only a portion of that side. For example, the back of the plenum may have one or more panels that may, or may not, cover the entire surface. The panels may also be mounted on the interior surface of the superstructure or the exterior of the superstructure. The panels may be mounted on the interior surface of the superstructure to provide a smoother surface for airflow, such as in the case of an air-cooled heat exchanger.

The heat exchanger plenum apparatus may incorporate heat baffles between the heat exchanger and the engine silencer. The baffles may direct airflow or other medium used in the heat exchanger and thus may be mounted in various configurations, including, but not limited to, vertically, horizontally, and/or radially.

In one exemplary embodiment, a gas compression skid package may comprise a compressor, an engine and a heat exchanger plenum (cooler) and are joined on a skid or other platform. Once joined, the entire unit is shipped to the work site. Alternatively, the compressor, engine and heat exchanger plenum reside on separate skids and are later joined at the remote worksite.

Embodiments of the invention are illustrated in the accompanying drawings depicting an air-cooled type heat exchanger plenum whereby a medium to be cooled acted upon, for instance, by passing forced air through a heat exchanger housed substantially within the heat exchanger plenum. Similar principles can be applied to a liquid-cooled type heat exchanger where the engine silencer is housed substantially within the heat exchanger plenum and submerge in the liquid-cooling medium. In the embodiments shown, the compressor, and engine reside on separate skids (which are not shown). However, the heat exchanger plenum of the invention may be coupled with an engine and compressor on one skid, collectively or singularly, without departing or detracting from the arrangement, function, or performance of the heat exchanger plenum as described.

Turning to FIG. 1, an illustration of one embodiment of the engine silencer 1140 incorporated into a heat exchanger plenum 1000 is shown. The depiction shows the panels 1185 as translucent for additional clarity. The heat exchanger plenum 1000, may incorporate additional end structure, such as panels and struts (not shown), which may further define the overall structure of the heat exchanger plenum 1000 and the extents of the interior volume therein. The interior volume is not limited to inner dimensions of the structure, but may substantially include the volume within the exterior bounds of the heat exchanger plenum 1000. In FIG. 1, the engine silencer 1140 is depicted substantially within the heat exchanger plenum 1000 supported by a truss assembly (1005-1135). The truss assembly (1005-1135) may use angled struts or a combination of angled, vertical, and horizontal struts to support the engine silencer 1140 and associated intermediate silencer mounting frame assembly 1135 (with cradle and straps). The struts may be formed from box channel, angle, tube, or other structural components suitable for its intended purpose. For example, the engine silencer may be cylindrical in shape and require a radiused support for mounting, as shown by the engine silencer 1140, and cradle and frame 1125 depicted in FIG. 1. Panels 1185 are joined to the struts throughout the plenum where necessary to control airflow and access. The panels 1185, as well as the cutouts, may be supported by the plenum superstructure or truss supporting the engine silencer using various attachment methods, such as fasteners or welds. Cutouts are provided for in the plenum panels 1185, where necessary, to facilitate and coincide with connection of exhaust inlet, such as around the inlet flange 1160 and outlet piping. The panel in this area as mentioned above is depicted as translucent providing visual clarity to the inner structure.

Connections, such as for the exhaust inlet and outlets, may be enhanced by use of flanges 1155, 1160 for the outlet and inlet respectively. The engine silencer 1140 shown in FIG. 1 is attached to the exterior piping 1145, 1150, at or near the panel surfaces of the plenum, via the respective flanges 1155, 1160. The flange mating surfaces and plenum exterior surfaces may be coplanar or set off from one another, to provide a flush or near flush exterior surface. For instance, the flange may rise a predetermined amount above the exterior surface of a panel, or be a predetermined distance below the surface of a panel. Connection of the exhaust inlet and outlet piping 1145, 1150, as shown, may be made at the respective flange mating surfaces.

Figure 2A:
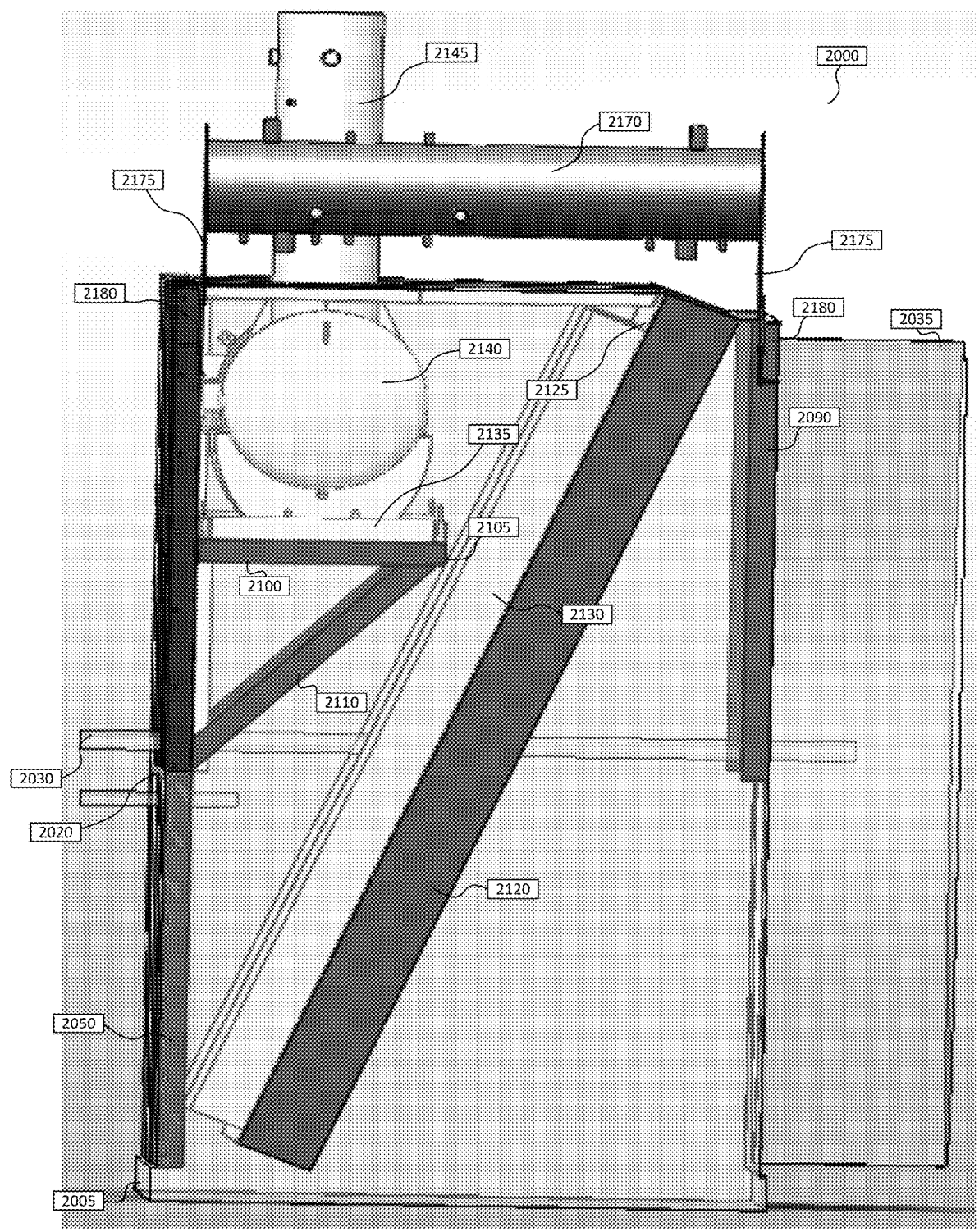
FIG. 2A is an end view of an exemplary embodiment of a heat exchanger plenum structure constructed to support an internal silencer and depicts a silencer installed.

Other openings in the truss or panels may facilitate access to internal structures. Openings in the truss may be provided by arrangement of the structural members as shown in the figure. In FIG. 1, the truss provides an elongated opening for passage of the exhaust gas through the panel cutout into the internal engine silencer 1140. The same elongated opening provides for an access door 1165 (and related cutout) in the panel to gain access to the catalyst portion of the engine silencer 1140. A short vertical intermediate strut 1065 is provided within the truss to further support the silencer 1140 and compensate for the larger opening above the horizontal intermediate strut 1060, while allowing additional mechanical devices, such as a fan shaft 1030, to pass therethrough (as shown in FIG. 2A below).

The exhaust piping, or some portion thereof, may be temporarily (and removably) mounted in the plenum for purposes of transportation. Once on site, the exhaust piping is removed from the temporary mounting and ultimately mounted in the final position to complete exhaust gas flow from the engine to the engine silencer 1140 housed within the heat exchanger plenum 1000.

The instant embodiment of the heat exchanger plenum 1000 is constructed having a base assembly 1005 comprising two longitudinally horizontal struts and at least two horizontal cross struts joined at their ends (additional base structure not shown). An A-frame assembly comprises substantially the lower portion of the long side of the heat exchanger plenum 1000 and is formed of an A-frame strut 1010, (four shown) joined at their lower end to base assembly 1005. The facing side, the 'A' side, is opposed to the 'B' side. The 'B' side comprises the fan (not shown) and fan shroud 1035, wherein the fan moves air into the heat exchanger plenum 1000 to transfer heat from the heat exchanger 1120.

Lower midspan vertical struts 1015, ('B' side not shown) are joined at their lower end to the base frame 1005 about the mid section. Midheight horizontal struts 1020 ('B' side not shown) are joined about their midspan to the lower midspan vertical strut 1015 about the end of the lower midspan vertical struct 1015 distal to the base assembly. The Midheight horizontal struts 1020 are also and joined to the A-frame struts 1010 distal to base assembly 1005 about half distance between each end and the lower midspan vertical strut 1015. Mid span of the midheight horizontal struts 1020, the fan shaft 1030, associated bearings, support plates, and fan (fan not shown) are joined on top; the fan shaft having a drive end and a fan end (the fan end associated with the 'B' side). Providing positive airflow through the heat exchanger 1120 and heat exchanger plenum 1000, the fan is driven by an engine, such as an internal combustion engine. Exhaust gases from the engine are piped to the internal engine silencer 1140 housed within the heat exchanger plenum 1000.

An upper hood structure is joined to the top of the A-frame assembly on both the 'A' side and 'B' side. Due to the difference of equipment residing on 'A' side and 'B' side, the arrangement of struts that comprise the upper hood structure may differ. Upper vertical struts 1025 are joined about their lower ends to the midheight horizontal strut 1020 at about their ends and at various intermediate positions dependent on for example fan shaft location, panel size, and fan shrouding. As mentioned and shown in the depiction of FIG. 1, the fan shaft and associated bearings 1030 are mounted on and above the A-frame assembly; passing through the upper hood structure. The fan shroud 1035 is joined to the A-frame and upper hood structure on the 'B' side, whereby the fan may pull air into the 'B' side of the heat exchanger plenum and force the air through the heat exchanger 1120 and up out the top of the heat exchanger plenum 1000, whereby a medium needing to be cooled or heated is acted upon.

On the 'A' side, the corners of the heat exchanger plenum are comprised of a corner full strut 1050, extending to upper corner of the plenum 1000 and joined about the ends of the base assembly 1005, and about the ends of the midheight horizontal struts 1020. The 'B' side may have the same arrangement. Upper vertical intermediate struts 1055, are joined about their lower end to the midheight horizontal struts 1020 about their intermediate portions and between their ends. Horizontal intermediate strut 1060, joined about its ends between the upper vertical intermediate struts 1055 about midway up their height. Short vertical intermediate strut 1065, is joined about their ends between the horizontal intermediate strut 1060 and the midheight horizontal strut 1020, adding additional strength to the structure caused by the larger opening provided above the horizontal intermediate strut 1060.

An upper frame horizontal strut 1070, part of the upper hood structure, is joined about it's ends to the corner full struts 1050 at their ends distal to the base assembly 1005 and joined to the upper vertical intermediate struts 1055 (particularly about A-Frame 'A' side) about their ends distal to the midheight horizontal strut 1020 (of A-Frame 'A' side).

In the embodiment depicted in FIG. 1, upper crossmember struts 1075 are joined about their ends proximate to the 'A' side A-Frame, to about the upper end of each corner full struts 1050, to about each end of the upper frame horizontal strut 1070, or to both. The distal ends of the upper crossmember struts 1075 may be joined to the upper portion of the heat exchanger 1120 or pass over the heat exchanger and join to the opposing corner about the upper end of the 'B' side vertical strut 1090 to form a substantially squared angle to the back of the plenum. Upper diagonal brace struts are not shown in this embodiment. Diagonal brace struts might be joined about the midsections of the upper crossmember struts 1075 and proximate to the ends of the upper frame horizontal strut 1070 to form a corner brace. The upper diagonal brace struts may alternatively pass over and connect the upper crossmember struts to the 'B' side upper frame horizontal strut if the height of the heat exchanger allows. Intermediate crossmember struts (3), joined at an end proximate to the A-frame 'A' side to the upper frame horizontal strut 1070 at intermediate locations along its length. The opposing ends are joined to the upper side frame of the heat exchanger (not shown). An upper half corner strut 1090, at each end of the heat exchanger plenum upper hood, is joined to 'B' side A-Frame midheight header (not shown) and extends upward about the upper extent of the plenum 1000.

Silencer support frame assembly (1095-1105), within the interior of the heat exchanger plenum as shown in FIG. 1 supports the engine silencer 1140 and comprises an inner horizontal silencer support strut 1095, which can be joined to one or more of the following: 1) along a portion of its length to a portion of the horizontal intermediate strut 1060; 2) about the midsection of one or more upper vertical intermediate struts 1055; or 3) to a corner full strut 1050 about the upper portion. The silencer support frame assembly further comprises a plurality of silencer support crossmember struts 1100 joined at proximal ends to the inner horizontal silencer support struts 1095 about its ends and along intermediate positions down its length. An outer horizontal silencer support strut 1105, joined about its length to the silencer support crossmember struts 1100 at their distal ends, opposite the inner horizontal silencer support strut 1095. The frame is supported distal to the A-frame by one or more diagonal silencer support struts 1110 joined about their ends between one or more distal positions of the silencer support crossmember struts 1100, and about midsection of the corner full struts 1050 near the midheight horizontal strut 1020.

A corner short end strut may be added (as shown in embodiments of FIGS. 3A-3G) and joined about its length to the upper portion of the corner full struts 1050 extending down to the proximal end of an outermost silencer support crossmember strut 1100.

The heat exchanger 1120 is joined to the base 1005 via support rest (not shown), bracing about the 'B' side A-frame and upper hood. Heat exchangers of the embodiments shown extend substantially from the base assembly to the upper extents of the plenum and substantially from one side of the heat exchanger plenum to the opposing side. Headers and plumbing corresponding with the heat exchangers may reside within the plenum boundaries or extend marginally outside the plenum boundaries, while maintaining the heat exchanger's location is substantially within the plenum structure. In the embodiment shown, the heat exchanger is rotated about the horizontal axis, i.e., angled from the vertical such that the bottom of the heat exchanger 1120 rests about the 'A' side and the top of the heat exchanger 1120 rests about the 'B' side. This arrangement maximizes the heat exchanger area for a given plenum height. Other arrangements are possible. The heat exchanger, for example, may be placed vertical with no angular displacement, horizontal, or rotated about the vertical axis (i.e. angled horizontally). In the embodiments shown, the heat exchanger forms two internal volumes on opposing sides of the heat exchanger: the heat exchanger intake side volume, and the heat exchanger output side volume, wherein the output side is directed substantially facing up. The embodiments shown in the figures also place the internal engine silencer mount 1120, 2120, 3120 in the output side volume of the heat exchanger plenum 1000, 2000, 3000. While this is most beneficial for cooling, other arrangements can be achieved with the silencer and associated support structure placed in the intake side volume.

The plumbing connections for the heat exchanger 1120 are not shown, but may be distributed along the headers to match a customer specification. A heat exchanger may additionally extend to the upper extremity of the heat exchanger plenum or match the extent of the height with crossmembers attaching thereto along the head boxes and/or the tubesheet upper rail. Heat exchangers may be fabricated in various configurations as further depicted in FIG. 3A-3G. For example a heat exchanger may be formed from one or more tube sheets and be joined to one another. Tube sheets may be stacked vertically with the header boxes residing at the ends (with tubes carrying the medium to be operated on flowing from side to side) as shown in FIG. 3C. Other configurations are possible.

The engine silencer 1140, depicted in FIG. 1 is mounted to an intermediate silencer mounting frame assembly 1135, comprising a cradle, frame, and optional strap. The silencer mounting frame assembly 1135, is joined to the silencer support frame assembly. The silencer mounting frame assembly 1135 may be joined to the silencer support frame assembly's horizontal struts, namely the inner horizontal silencer support strut 1095, the silencer support crossmember struts 1100, and outer horizontal silencer support strut 1105, or some combination thereof.

The engine silencer 1130 may be premounted to the silencer mounting frame assembly 1135 and subsequently installed into the heat exchanger plenum prior to delivery to the remote site. Alternatively, an engine silencer may be installed directly to the silencer support frame assembly, without use of an intermediate silencer mounting frame assembly, such that the installation results in less weight. Cradles (without the mounting frame) may be affixed to the engine silencer directly with the cradles thereafter attached to the silencer support frame assembly. Alternatively, the cradles may be first affixed to the one or more silencer support frame assembly members (inner horizontal silencer support strut, silencer support crossmember struts, or outer horizontal silencer support strut) and thereafter an engine silencer mounted in the cradles. Cradles may be fabricated to accept various cross sections, such as the circular cross section engine silencer shown in the FIGS. 1, 2A, 2B, 3D, and 3E.

FIGS. 2A-8 are exemplary illustrations of an alternative embodiment of the engine silencer 2140 incorporated into a heat exchanger plenum 2000. FIG. 2A represents an end view having 'A' side to the left and 'B' side to the right, while FIG. 2B is an isometric view of the embodiment having panels 2185, 2190 (among others) lacking translucent depictions. The near end panels, however, are not shown in FIG. 2A and FIG. 2B, providing clarity into the interior volume of the heat exchanger plenum 2000. In the instant embodiment shown in FIG. 2A, the engine silencer 2140, is depicted in the foreground, and further reflected in the isometric view represented by FIG. 2B. Although the illustrations depict the engine silencer 2140 to be placed in the upper portion ('A' side) of the heat exchanger plenum 2000 (outlet side) and on the left end when viewed from the 'A' side, the engine silencer 2140 may be placed in other locations, such as the bottom portion ('B' side, inlet side). Likewise, the truss for supporting an engine silencer may reside at alternative locations within a heat exchanger plenum so as to coincide with the engine silencer placement. In addition, alternative structural arrangements may be required to stiffen or lighten the heat exchanger plenum 2000 based on weight requirements, customer specifications or equipment changes.

The heat exchanger plenum 2000 is formed from a base with various vertical, horizontal and diagonal struts extending therefrom. Corner full struts 2050 are joined to the base assembly 2005 and extend to the upper bounds of the structure. Additionally, A-frame struts 2010 are joined at their lower end to base assembly 2005 extending upwards and join midheight horizontal strut 2020. A lower midspan vertical strut 2015 also joins between the base assembly 2005 and the midheight horizontal strut 2020. This vertical strut, as previously described, supports the fan shaft and related parts on its upper surface.

Joined to and above the midheight horizontal strut 2020 are upper vertical struts 2025, upper vertical intermediate struts 2055, short vertical intermediate strut 2065. The opposing end of these upper vertical struts 2025, upper vertical intermediate struts 2055, and short vertical intermediate struts 2065 are joined to an upper frame horizontal strut 2070. Some portions of these structures, including the A-frame and upper hood are duplicated for the 'B' side of the heat exchanger plenum 2000, although there exact arrangement will differ based on the fan arrangement and lack of silencer mounting. Upper vertical struts 2025, upper vertical intermediate struts 2055 and short vertical intermediate struts 2065 may be located in alternative locations than shown Reinforcing the upper hood assembly, are several crossmembers and diagonal bracing. The 'A' side and 'B' side of the upper hood portion of the heat exchanger plenum 2000 are joined by upper crossmember struts 2075 at the ends, where they join opposing upper frame horizontal struts 2070. The upper corners are further braced by upper diagonal brace struts 2080, joined to the upper crossmember struts 2075 and upper frame horizontal struts 2070. Upper frame horizontal strut 2070, of the 'A' side, is joined to the upper heat exchanger rail 2125 by intermediate crossmember struts 2085 at intermediate positions along the 'A' side upper frame horizontal strut 2070 span. Intermediate crossmember struts may alternatively extend over the heat exchanger to the opposing 'B' side upper frame horizontal strut 2070 if the heat exchanger is low enough to allow such connection while still providing sufficient reinforcement.

Within the upper hood of the heat exchanger plenum 2000, engine silencer inlet flange 2160, and silencer outlet flange 2155 are exposed. Silencer exhaust outlet 2145 is shown attached to its corresponding flange. A silencer exhaust inlet is not shown. Within substantially the same panel area as the silencer inlet flange 2160, a catalyst access panel 2165 is made available to service the silencer's catalyst components.

A fan shaft assembly 2030 (bearings supports and fan not shown) are depicted traversing from the exterior 'A' side through to the 'B' side of the heat exchanger plenum 2000, where the fan shaft terminates within a fan shroud 2035. The fan shroud is joined to the 'B' side A-frame and upper hood. To further reinforce the heat exchanger plenum 2000 with the engine silencer 2140 installation, 'B' side corners are reinforced with upper half corner struts 2090 (one shown), and joined to 'B' side A-Frame midheight header (not shown) and extending upward about the upper extent of the heat exchanger plenum 2000. These may be in addition to corner struts already provided at the 'B' side corners that may extend from the base assembly to the upper extent of the heat exchanger plenum.

The engine silencer 2140 is provided on a silencer mounting frame assembly 2135, as previously described with respect to FIG. 1, wherein the silencer mounting frame assembly 2135 is attached to the plenum structure. Portions of the truss supporting the engine silencer (as opposed to that for stiffening the overall structure) may extend from the upper portion of the heat exchanger plenum to the bottom portion of the heat exchanger plenum, about the base.

In the instant embodiment, diagonal silencer support struts 2110 are incorporated into the truss extending from approximately midway up the height of the heat exchanger plenum 2000 to the far side of the silencer near the heat exchanger louver assembly 2130. Silencer support crossmember struts 2100, are joined at their ends between an inner horizontal silencer support strut (not shown) and an outer horizontal silencer support strut 2105. The outer horizontal silencer support strut 2105 ties the ends of the crossmember struts 2100 to each other. The horizontal members of the silencer support (outer, inner, crossmembers) form a silencer support frame assembly which is further supported by diagonal silencer support struts 2110 joined at the upper end to silencer support crossmember struts 2100 and may be attached via various attachment methods, such as fasteners or welding. The lower end of the diagonal silencer support struts 2110 are joined to various points along the interior of the heat exchanger plenum, including the corner full strut, 2050 at the foreground position. Intermediate diagonal silencer support struts 2110 (hidden in FIG. 2*a*) may be joined to the 'A' side midheight horizontal strut 2020, upper vertical intermediate struts 2055, or short vertical intermediate strut 2065 dependent on their placement.

Figure 2B:
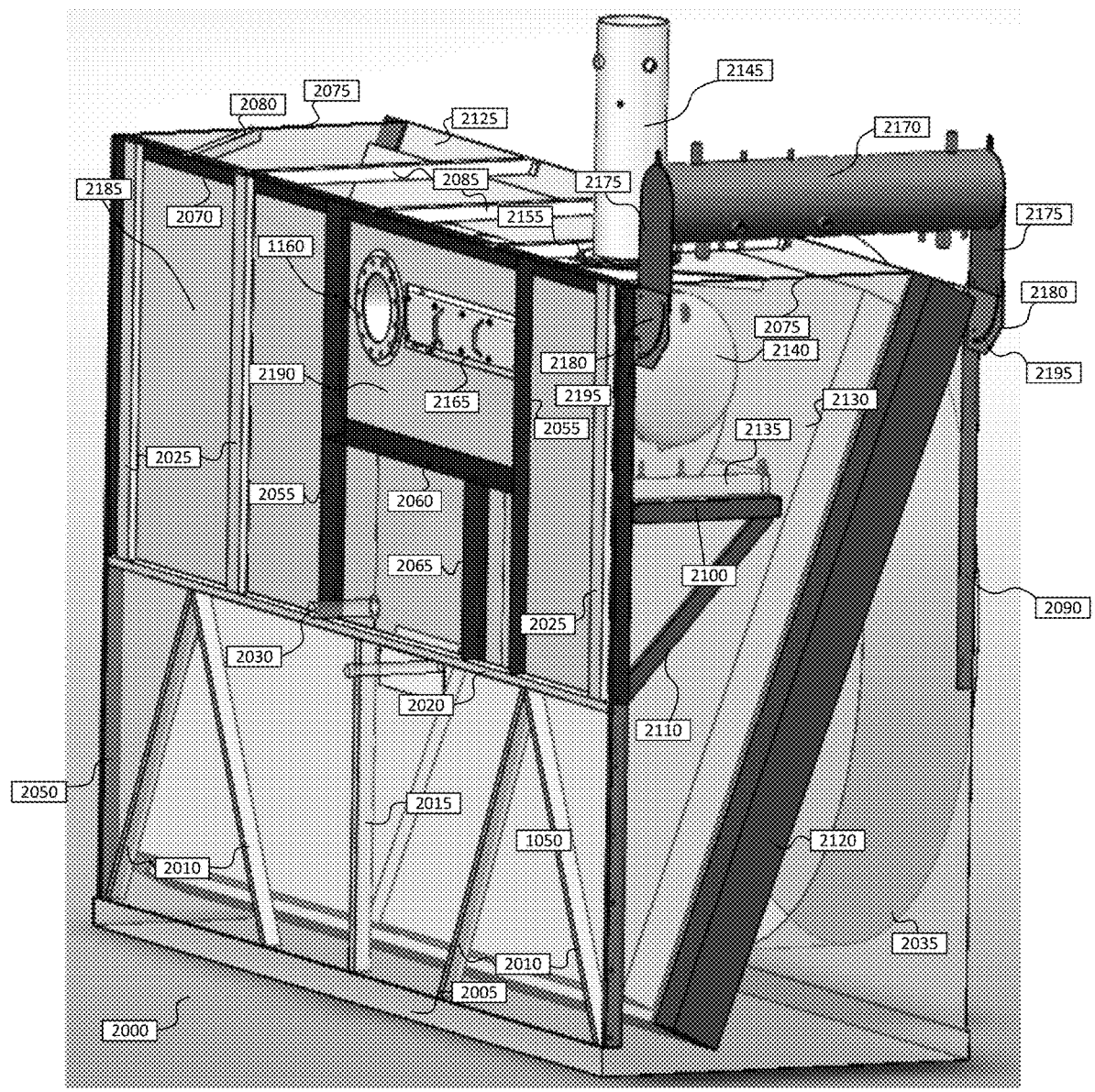
FIG. 2B is an isometric view of an exemplary embodiment of a heat exchanger plenum structure showing an internal silencer support structure, a silencer and various upper panels installed.

Additional devices may be incorporated into or onto the heat exchanger plenum. For example, a surge tank 2170 is shown to be mounted to the heat exchanger plenum 2000 via two hinging surge tank mounting brackets 2180 and interfacing surge tank end plates 2175, each mounted on opposing sides as shown. The surge tank 2170 is hinged about the interface by use of a pivot pin and arced slot 2195. Surge tank mounting brackets 2180 may reside on each side of each surge tank end brackets 2175. The hinging surge tank mounting brackets 2180, firmly attached to the heat exchanger plenum 2000 superstructure or truss at the corner full strut 2150, may each have one fixed pivot point provided either by a pin or hole (depending on the surge tank arrangement), and an arced slot 2195. The surge tank mounting brackets 2180 coincide with corresponding surge tank end brackets 2175. Arced slots 2195 are shown fabricated into the surge tank mounting brackets 2180, while the surge tank end brackets rotatably slide within their interfaces about the pin. The surge tank end brackets may comprise a through hole or arced slot that coincides with the arced slot 2195 shown. Conversely, alternative arrangements may be used wherein a slot is provided in both brackets, or the surge tank end brackets 2175, alone. The surge tank end brackets 2175 may be an integral part of the surge tank 2170 as shown or a separate component as part of a surge tank assembly. Alternative arrangements may be envisioned to mount other peripheral equipment related to the apparatus, in a similar matter. The surge tank 2170, in the exemplary illustration of FIGS. 2A, and 2B is stowed for transport in the lower position and bolted in place by use of a fastener through the arced slots 2195 and the surge tank end plates 2175. When desired, the surge tank 2170 is repositioned in the higher position (as shown) by adjustment of the tank and fasteners through the arced slots 2195, holding the surge tank 2170 in firm registration.

Figure 3A:
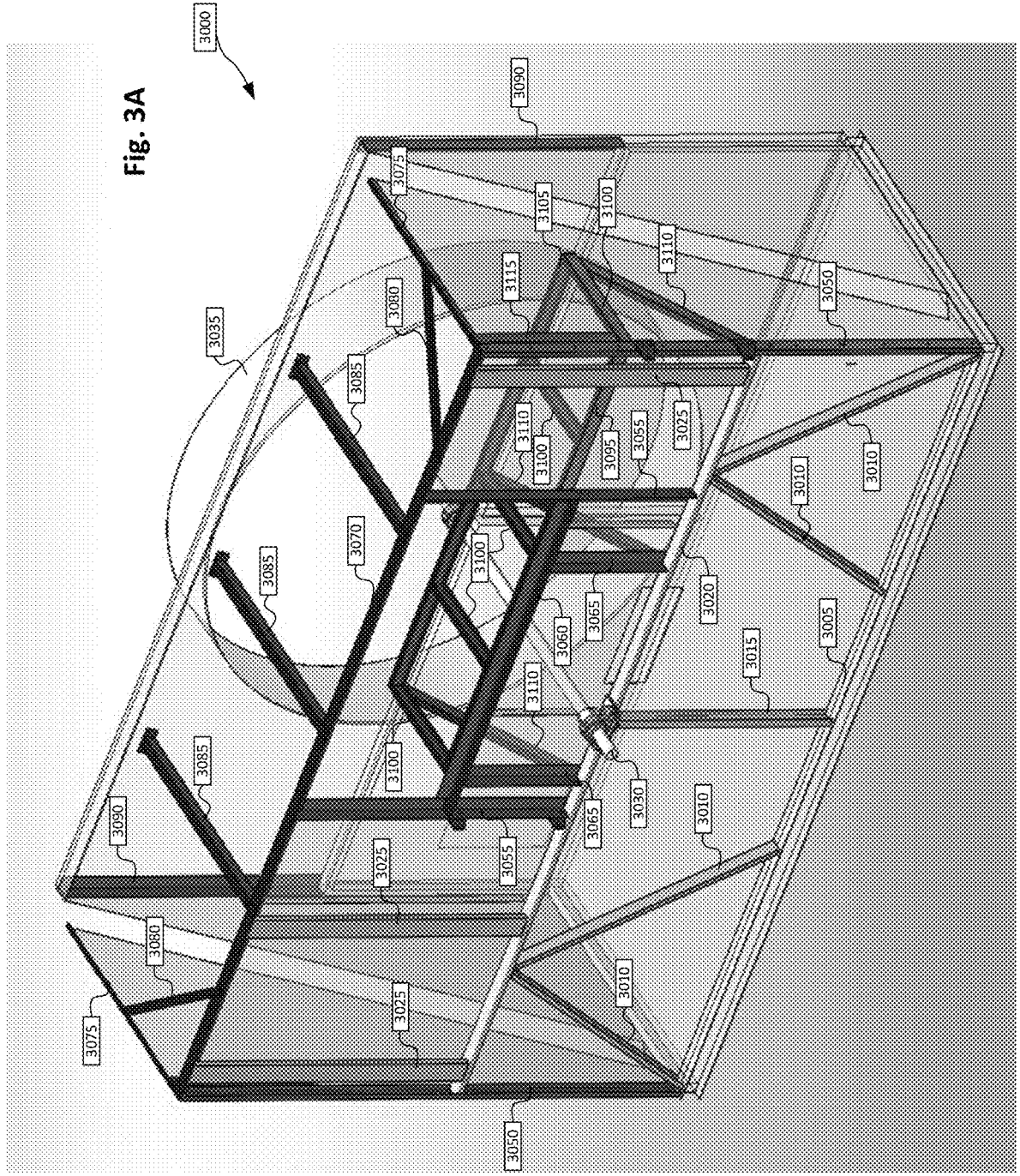
FIG. 3A is an isometric view emphasizing reinforce areas of an exemplary embodiment of a heat exchanger plenum structure constructed to support an engine silencer internally, wherein a heat exchanger, enclosure panels, and engine silencer are not shown.
Figure 3B:
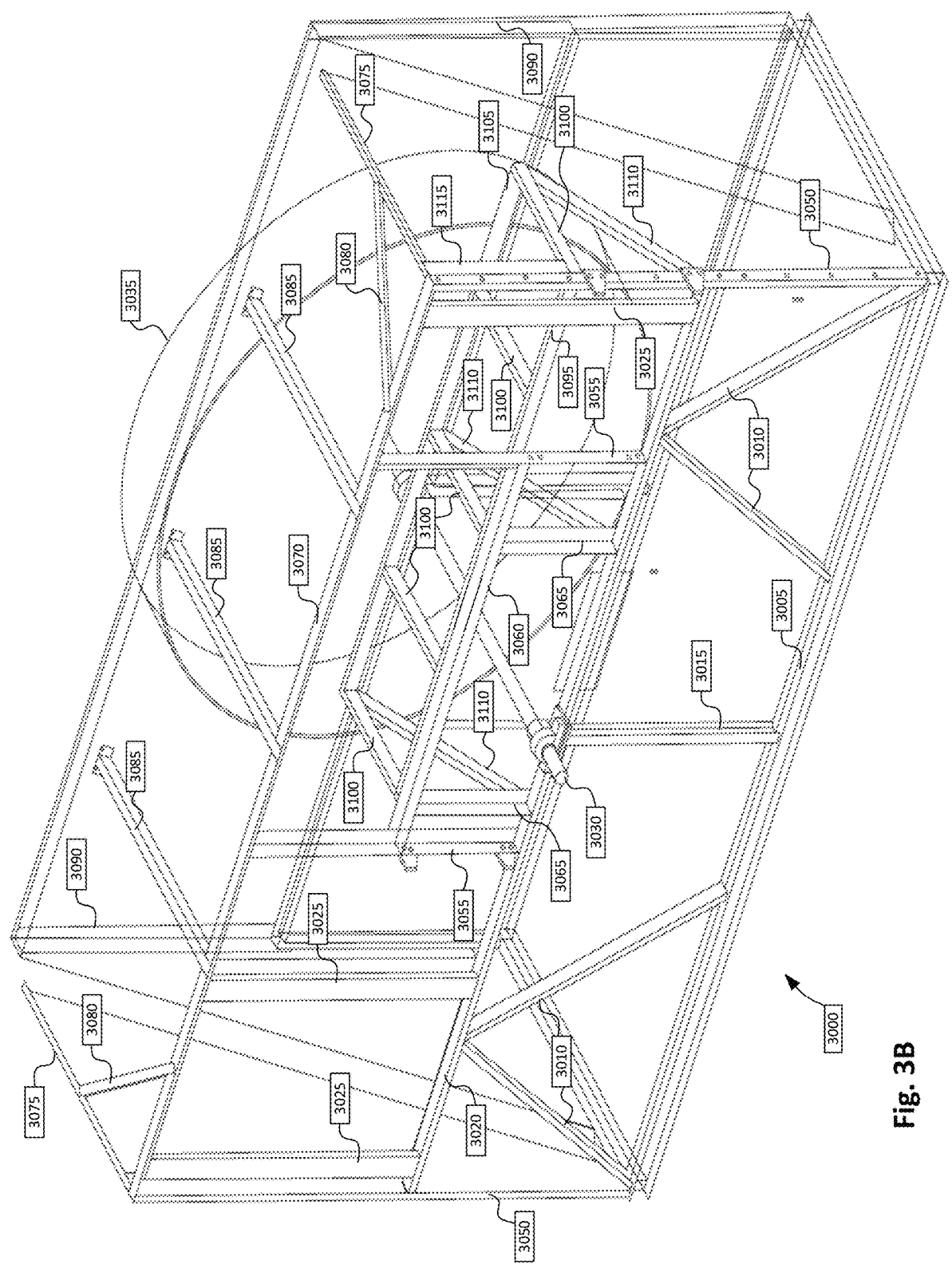
FIG. 3B is an isometric view line drawing depicting an exemplary embodiment of a heat exchanger plenum structure showing a truss structure comprising struts to support an engine silencer internally, wherein a heat exchanger, enclosure panels, and engine silencer are not shown.
Figure 3C:
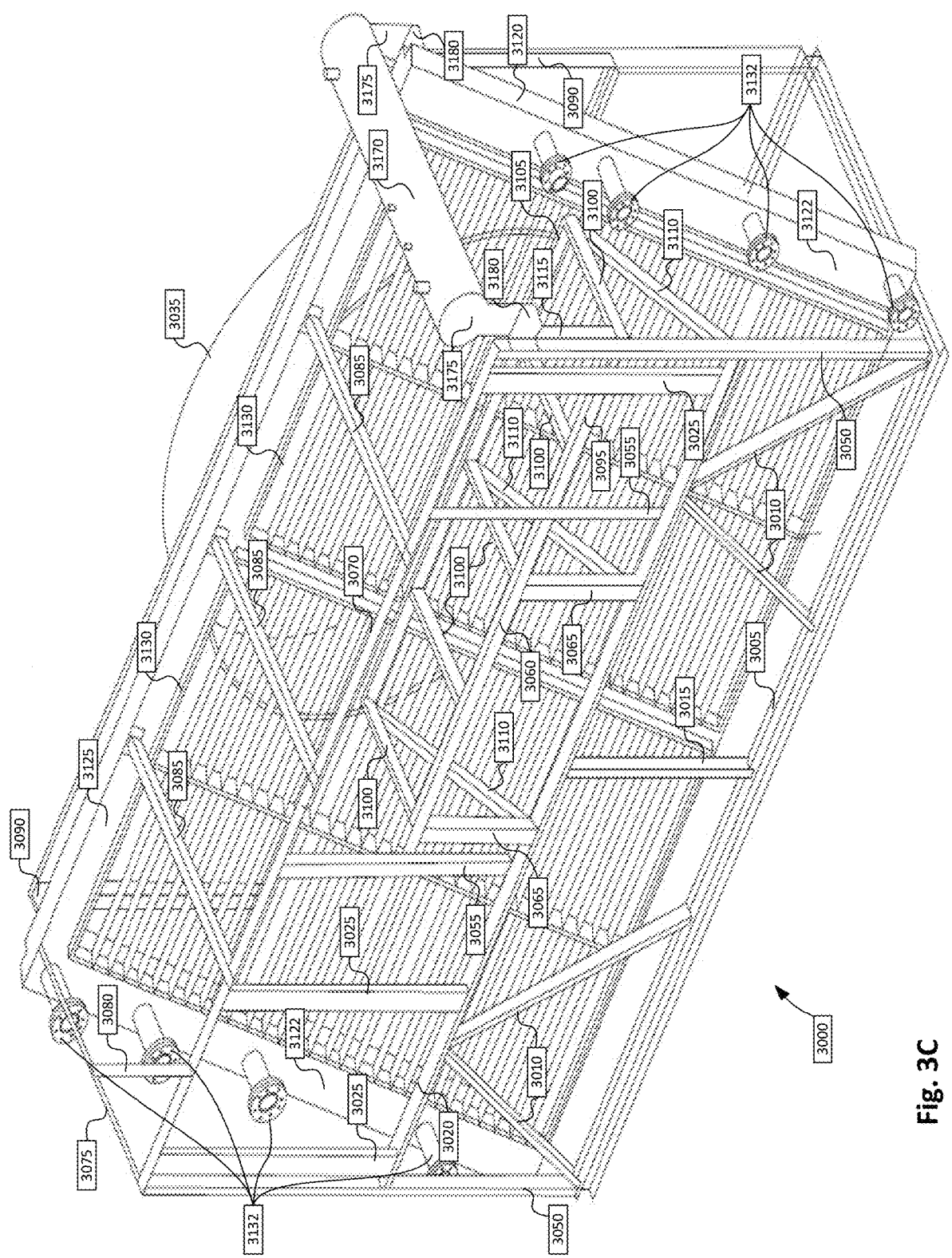
FIG. 3C is an isometric view line drawing depicting an exemplary embodiment of a heat exchanger plenum structure showing a truss structure to support an engine silencer internally on the output side of the heat exchanger, wherein enclosure panels and engine silencer are not shown.

Turning to FIGS. 3A-3G, an alternative embodiment of a truss structure for a heat exchanger plenum comprising an internal silencer is depicted in various arrangements. FIG. 3A depicts highlighted areas added or reinforced to accommodate an internal silencer. The internal silencer, fan enclosure panels and heat exchanger are not shown. With respect to FIG. 3A (through FIG. 3G where appropriate), heat exchanger plenum 3000 comprises a base assembly 3005 comprising two longitudinally horizontal struts and at least two horizontal cross struts joined at their ends (additional base structure not shown). An A-Frame assembly ('A' side shown) is fashioned from multiple A-frame struts 3010 joined at their lower end to base assembly 3005. A similar arrangement is provided for the 'B' side of the heat exchanger plenum 3000, but not shown. At the midspan of the long side of the base assembly 3005, a lower midspan vertical strut 3015 is joined about its lower end to the base frame 3005. The midspan vertical struts 3015 (of the 'A' and 'B' sides) are further joined at the opposing end, distal to the base assembly 3005, to midheight horizontal struts 3020 ('B' side not shown). The midheight horizontal struts 3020 are further joined to the A-frame struts 3010 distal to base assembly 3005 about half distance between each end and the lower midspan vertical strut 3015.

An upper hood structure substantially forms the upper portion of the truss structure for the heat exchanger plenum 3000 and is again comprised of an 'A' side and 'B' side. With respect to the 'B' side shown in FIGS. 3A-3G, the structure is fashioned to accommodate the fan arrangement and support the heat exchanger.

The upper hood structure comprises upper vertical struts 3025, joined about their lower ends to the midheight horizontal strut 3020 at about its end and an intermediate position. The fan shaft 3030, associated bearings, support plates, and fan (fan not shown), are joined on top and about the midspan of the midheight horizontal struts 3020; the fan shaft having a drive end and a fan end and pass through the lower portion of the upper hood structure. The fan shroud 3035, joined to the A-frame and upper hood on the 'B' side encircles the fan, which is driven by the fan shaft and likewise supported by the bearing described. A corner full strut 3050, defines the 'A' side corner boundaries of the heat exchanger plenum 3000 and extends to upper corner of the heat exchanger plenum 3000 and joins about the corners of the base assembly 3005, and about the ends of the midheight horizontal struts 3020.

Upper vertical intermediate struts 3055, are positioned at intermediate locations within the upper hood structure and joined about their lower end to the midheight horizontal struts 3020 about their intermediate portions and between their ends. A Horizontal intermediate strut 3060, is joined about its ends between the upper vertical intermediate struts 3055 about midway up their height. Located between the upper vertical intermediate struts 3055 are short vertical intermediate struts 3065, joined about their ends between the horizontal intermediate strut 3060 and the midheight horizontal strut 3020. A further intermediate strut 3065 may be located at a similar height and about the corner full strut 3050 to further strengthen the structure supporting an engine silencer 3140.

The upper hood structure further comprises upper frame horizontal strut 3070, joined about it's ends to the corner full struts 3050 at their ends distal to the base assembly 3005 and joined to the upper vertical intermediate struts 3055 (of A-Frame 'A' side) about their ends distal to the midheight horizontal strut 3020 (of A-Frame 'A' side). Upper crossmember struts 3075, are joined about their ends proximate to the 'A' side A-Frame, to about the upper end of each corner full struts 3050, to about each end of the upper frame horizontal strut 3070, or to both. Upper diagonal brace struts 3080, are depicted about the 'A' side upper corners of the upper hood structure and joined about the midsections of the upper crossmembers 3075 and proximate to the ends of the upper frame horizontal strut 3070 to form a corner brace.

Figure 3D:
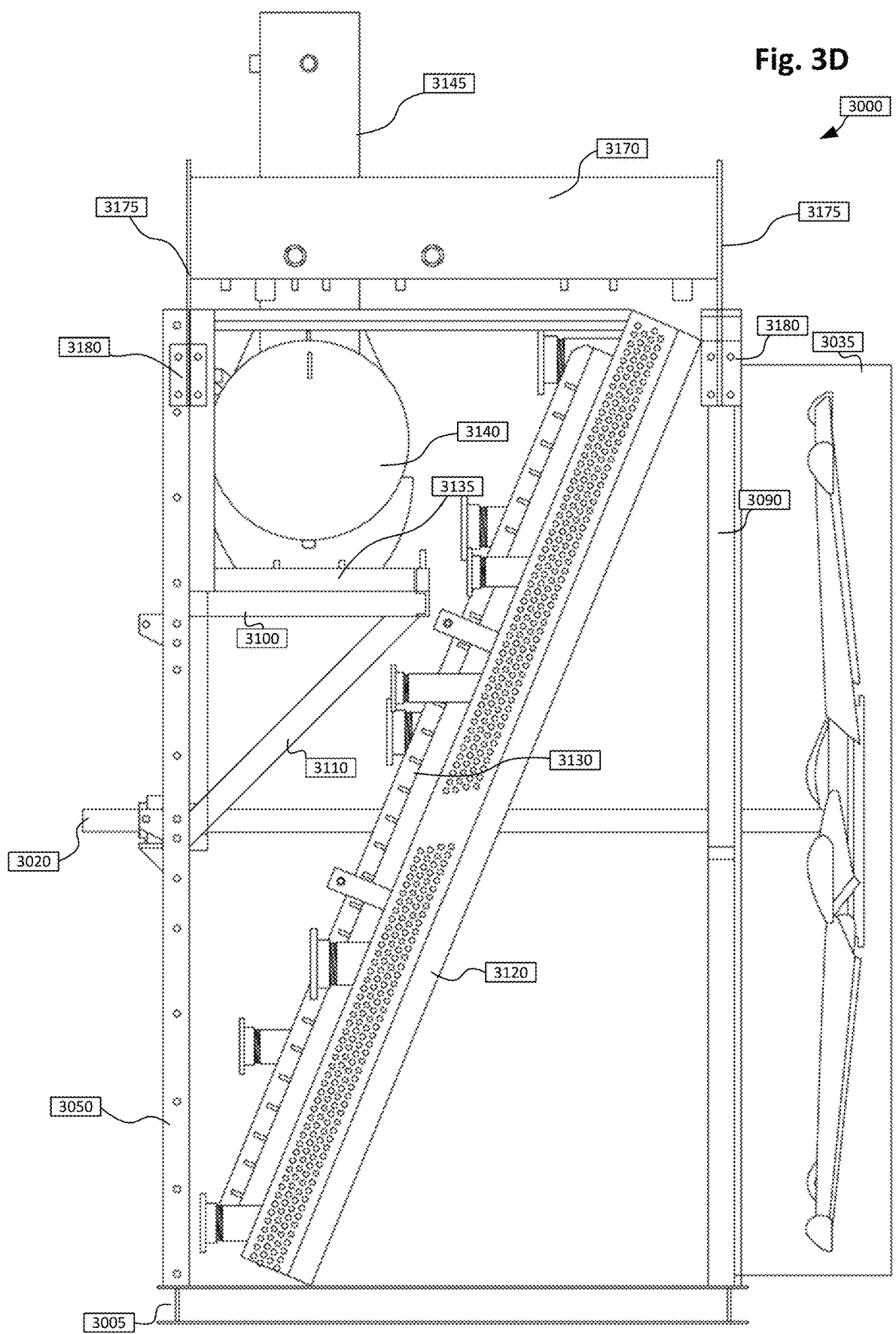
FIG. 3D is an end view line drawing depicting an exemplary embodiment of a heat exchanger plenum structure comprising a heat exchanger in conjunction with a truss structure supporting a substantially internal engine silencer above and on the output side of said heat exchanger.
Figure 3E:
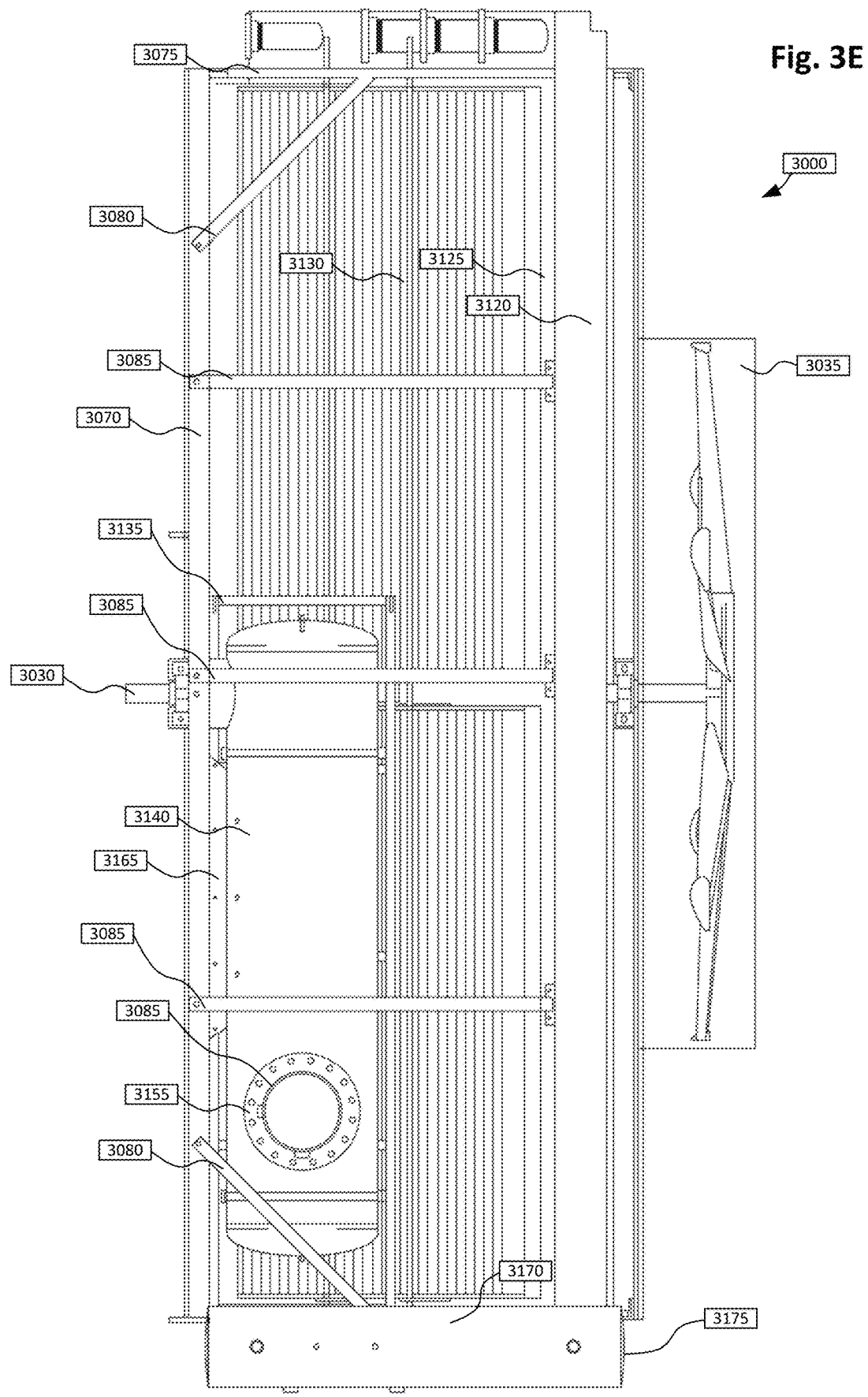
FIG. 3E is a top view line drawing depicting an exemplary embodiment of a heat exchanger plenum structure comprising a engine silencer substantially housed in said heat exchanger plenum with associated supporting truss structure.

To further brace the 'A' side upper hood structure, intermediate crossmember struts 3085, are joined at an end proximate to the A-frame 'A' side to the upper frame horizontal strut 3070 at intermediate locations along its length. The opposing ends are joined to the upper rail 3125 of the heat exchanger (as shown in FIG. 3C-3E). The 'B' side upper hood structure may comprise further reinforcement such as shown by upper half corner strut 3090, joined to 'B' side A-Frame midheight header (not shown) and extending upward about the upper extent of the plenum 3000.

A silencer support frame assembly, constructed within the heat exchanger plenum 3000 and residing on the 'A' side of the plenum is comprised of multiple truss structures to support the weight and location of the position of the engine silencer 3140. The silencer support frame assembly is joined using the various truss structures to the upper hood structure and lower A-Frame. For example, an inner horizontal silencer support strut 3095, is joined along a portion of its length to a portion of the horizontal intermediate strut 3060, joined to the midsection of one or more upper vertical intermediate struts 3055, joined to a corner full strut 3050 about the upper portion, or joined to a combination thereof. Silencer support crossmember struts 3100, of which five are shown, are joined at proximal ends to the inner horizontal silencer support strut 3095 about its ends and along intermediate positions down its length. Any number of silencer support crossmember struts may be used, their location, quantity and type dictated by the weight and mounting arrangement of the silencer. An outer horizontal silencer support strut 3105 is joined about its length to the silencer support crossmember struts 3100 at their distal ends, opposite the inner horizontal silencer support strut 3095. Their attachments form a squared off shape of the silencer support frame assembly.

To provide vertical support to the distal ends of the support crossmember struts 3100, several diagonal silencer support struts 3110 are joined about their ends between one or more distal positions of the silencer support crossmenber struts 3100, and about the midsection of the corner full struts 3050 near the near end of the midheight horizontal strut 3020, as depicted. As further reinforcement, a corner short end strut 3115, is shown joined about its length to the upper portion of the corner full struts 3050 extending down to the proximal end of an outermost silencer support crossmember strut 3100.

The heat exchanger 3120, as shown in FIG. 3C-3E is comprised of, among other components, headers 3122, upper and lower rails 3125 (lower not shown), louver assemblies 3130, and plumbing connections 3132.

FIGS. 3C-3E depict a surge tank 3170 mounted via a surge tank mounting bracket 3180 and surge tank end bracket 3175 to the upper near portion of the heat exchanger plenum 3000, where for transport purposes the surge tank 3170 can be swung down and retained in a lower position. Such positioning is provided for by, hinged attachment of the surge tank end bracket 3175 to the surge tank mounting bracket 3180. The surge tank end bracket is joined to the end of the surge tank and may form the end cap of the tank itself, or be attached to a completed surge tank assembly. One end of each surge tank mounting bracket is joined to the heat exchanger plenum 3000 (a corner full strut 3050 on the 'A' side and upper half corner strut 3090 on the 'B' side). The opposing end of each surge tank mounting bracket 3180 is fabricated with, for example, a hole to accommodate a pin or pivot and an arced slot to accommodate a fastener, such as a bolt and nut combination. The surge tank end bracket 3175 may be fabricated to accept the pin or pivot to allow rotation of the surge tank about the pin or pivot. In addition, the surge tank end bracket 3175 may be fabricated to accept the bolt passing through both the arced slot of the surge tank mounting bracket and the surge tank end bracket. The coinciding nut may be permanently affixed to the surge tank end bracket or provided as a loose component. In an alternative arrangement, the slot, bolt and nut arrangements may be reversed wherein the surge tank end bracket 3175 is provided with an arced slot through which a bolt is passed and through the surge tank mounting bracket 3180. Other forms of securing the hinged surge tank may also be used, such as a latching arrangement between the surge tank mounting bracket and the surge tank end bracket.

With respect to FIG. 3D (an end view) and FIG. 3E (a top view), a silencer mounting frame assembly 3135 is shown positioned above and coinciding with the silencer support structure. The silencer mounting frame assembly 3135, includes cradles, straps and frame to which the cradle is attached. The silencer mounting frame assembly 3135 may be joined to the silencer support frame assembly via fasteners or welding. Locating pins, blocks or plates may be incorporated into a silencer support frame assembly to aide in locating an engine silencer (with or without an associated silencer mounting frame assembly) into a internal space of a heat exchanger plenum. A silencer, and associated mounting frame if incorporated, may be field replaceable by generally withdrawing the components vertically or horizontally from a heat exchanger plenum. An engine silencer may additionally be installed without a silencer mounting frame assembly, whereby cradles and strapping are fabricated into the silencer support structure itself, thus lessening the weight and complexity.

Although the engine silencer (1140, 2140, and 3140) depicted in the FIGS. 1, 2A, 2B, 3D, and 3E exhibit a horizontal inlet and vertical outlet, other configurations are envisioned. For example, an engine silencer may have both inlet and outlet on the side or at opposing ends.

An engine silencer exhaust outlet 3145 (shown in FIGS. 3D-3E) extends from the silencer outlet flange 3155 (shown in FIG. 3E), upward and out beyond the upper bounds of the heat exchanger plenum 3000 framing. As previously described, the outlet location may take various forms and exist and one of several locations dictated by the ultimate design.

FIG. 3E depicts a top view of the internal silencer arrangement, where view of the silencer inlet flange is obstructed by the upper frame horizontal strut 3070, which also partially obstructs the view of the catalyst access panel 3165 and associated enclosure attached to the engine silencer 3140.

Enclosure panels for the heat exchanger plenum 3000 of the instant embodiment are not shown such that the interior of the heat exchanger plenum 3000 can be clearly shown. Similar to the enclosure panels of FIGS. 1, 2A and 2B, the panels are fastened to the struts of the heat exchanger plenum 3000 to provide air-flow control and protection from intrusion of weather and unwanted personnel. A silencer inlet-flange/catalyst-access panel may be provided, similar to that previously described such that openings are provided to provide for attachment of an engine exhaust inlet to the silencer inlet flange, and an access door/hatch for servicing the engine silencer 3140, and components therein.

Figure 3F:
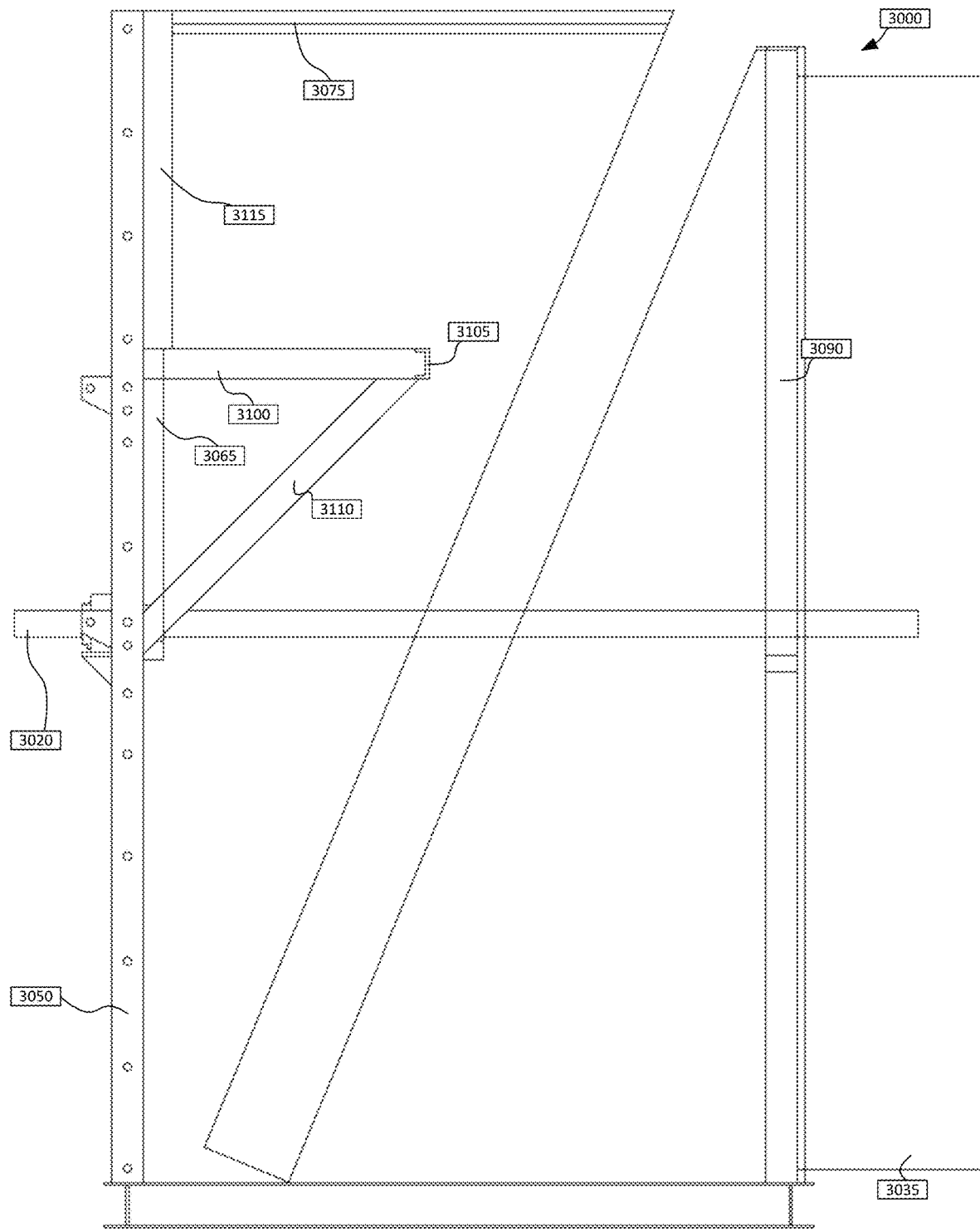
FIG. 3F is a left hand view line drawing of FIG. 3B depicting an exemplary embodiment of a heat exchanger plenum structure comprising a truss structure to support an engine silencer substantially housed in said heat exchanger plenum, wherein a heat exchanger, engine silencer and enclosure panels are not shown.
Figure 3G:
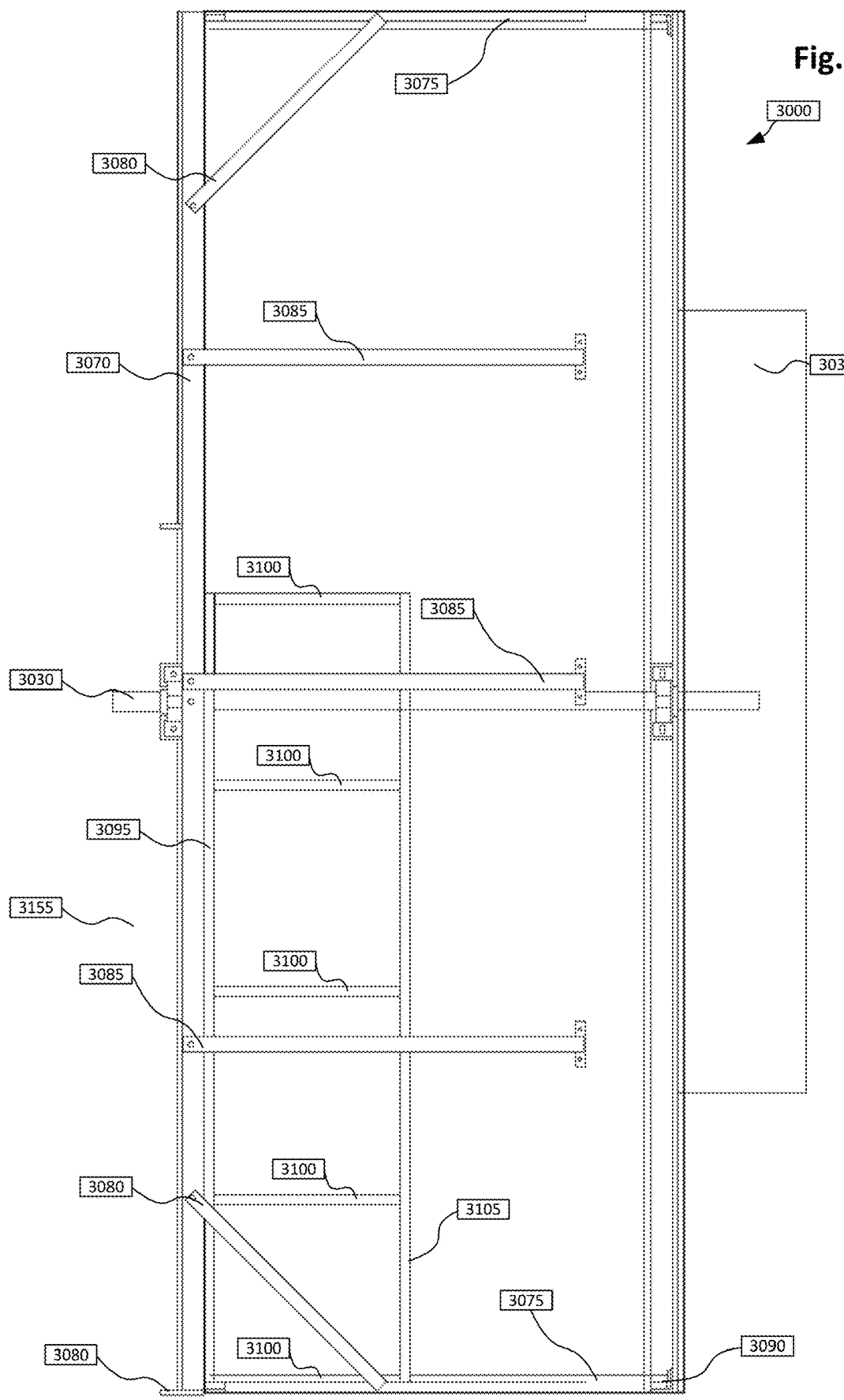
FIG. 3G is a top view line drawing of FIG. 3B depicting an exemplary embodiment of a heat exchanger plenum structure comprising a truss structure to support an engine silencer housed substantially within said heat exchanger plenum.

FIG. 3F depicts the present embodiment absent silencer and associated mounting frame, as well as a heat exchanger. A partial outline depicts the location where a heat exchanger is placed in the structure. The upper crossmember strut 3075 is depicted having a higher elevation than that of the 'B' side upper hood. While this depiction shows a gap between the upper crossmember strut 3075 and 'B' side upper frame horizontal strut 3070, structural integrity is achieved once a heat exchanger is installed and joined to each side of the heat exchanger plenum 3000.

STATEMENT REGARDING PREFERRED EMBODIMENTS

While the invention has been described with respect to the foregoing, those skilled in the art will readily appreciate that various changes and/or modifications can be made to the invention without departing from the spirit or scope of the invention as defined by the appended claims.

What is claimed is:

1. A heat exchanger plenum for incorporating an engine silencer and a heat exchanger therein, the heat exchanger plenum comprising:
    an interior volume defined by said heat exchanger plenum;
    a plenum frame structure comprising an opening configured to provide routing of exhaust gases from an exhaust gas source, external to said heat exchanger plenum, into said engine silencer, wherein said opening is defined by two or more horizontal struts, and two or more vertical struts, wherein said two or more vertical struts comprise an upper end and a lower end, said upper end is joined to at least one of said two or more horizontal struts, and said lower end is joined to at least another of said horizontal struts; and
    a truss disposed within said interior volume of said heat exchanger plenum and joined to at least one of said two or more horizontal struts and at least one of said two or more vertical struts for supporting said engine silencer.

2. The heat exchanger plenum of claim 1 further comprising a heat exchanger disposed substantially within said interior volume dividing said interior volume into a first part and a second part, said truss for supporting said engine silencer located within said second part.

3. The heat exchanger plenum of claim 2 wherein said second part of said interior volume is associated with an output of said heat exchanger.

4. The heat exchanger plenum of claim 3, wherein said heat exchanger output is has an upwardly directed flow.

5. The heat exchanger plenum of claim 1, wherein said heat exchanger plenum is portable.

6. The heat exchanger plenum of claim 1, further comprising openings for connection of said engine silencer to an exhaust gas inlet pipe, external to said heat exchanger plenum, and an exhaust gas outlet pipe, external to said heat exchanger plenum.

7. The heat exchanger plenum of claim 1, further comprising a heat exchanger substantially disposed within said interior volume and comprising an angular position relative to a horizontal axis traversing through said heat exchanger.

8. The heat exchanger plenum of claim 1, further comprising at least one exterior panel having one or more of the following:
- a cutout for connecting peripheral equipment; and
- an access door for gaining access to said interior volume.

9. The heat exchanger plenum of claim 1, further comprising access doors attached thereto for gaining access to said engine silencer.

10. A heat exchanger plenum comprising:
- an interior volume defined by said heat exchanger plenum;
- an engine silencer;
- a plenum frame structure comprising an opening configured to provide routing of exhaust gases from an exhaust gas source, external to said heat exchanger plenum, into said engine silencer, wherein said opening is defined by two or more horizontal struts, and two or more vertical struts, wherein said two or more vertical struts comprise an upper end and a lower end, said upper end is joined to at least one of said two or more horizontal struts, and said lower end is joined to at least another of said horizontal struts; and
- a truss disposed within said interior volume of said heat exchanger plenum and joined to said midheight horizontal strut and said one or more upper vertical intermediate struts for supporting said engine silencer.

11. The heat exchanger plenum of claim 10, wherein said engine silencer is substantially within said interior volume.

12. The heat exchanger plenum of claim 11, further comprising a heat exchanger disposed substantially within said interior volume dividing said interior volume into a first part and a second part, said truss for supporting said engine silencer located within said second part.

13. The heat exchanger plenum of claim 12, wherein said second part of said interior volume is associated with an output of said heat exchanger.

14. The heat exchanger plenum of claim 13, wherein said heat exchanger output is has an upwardly directed flow.

15. The heat exchanger plenum of claim 10, wherein said heat exchanger plenum is portable.

16. The heat exchanger plenum of claim 10, further comprising openings within said truss for connection of said engine silencer to an exhaust gas inlet pipe, external to said heat exchanger plenum, and an exhaust gas outlet pipe, external to said heat exchanger plenum.

17. The heat exchanger plenum of claim 10, further comprising a heat exchanger substantially disposed within said interior volume and comprising an angular position relative to a horizontal axis traversing through said heat exchanger.

18. The heat exchanger plenum of claim 1, further comprising
- a surge tank hingedly mounted externally to said heat exchanger plenum.

19. The heat exchanger plenum of claim 18, further comprising a slotted hinge bracket mounted externally to said heat exchanger plenum and fastened to a corresponding surge tank bracket affixed to said surge tank, wherein said slotted hinge bracket and said corresponding surge tank bracket join to form an interface to provide movement of said surge tank about said interface.

20. The heat exchanger plenum of claim 1 further comprising an intermediate horizontal strut joined between at least two of said two or more vertical struts at about their midspan, therein defining at least two openings.

* * * * *